United States Patent [19]

Pitt

[11] Patent Number: 5,127,735
[45] Date of Patent: Jul. 7, 1992

[54] SYSTEM FOR MEASURING THE POSITION IN SPACE OF AN OBJECT USING A LIGHT BEAM

[75] Inventor: Gillies D. Pitt, Hewelsfield, United Kingdom

[73] Assignee: Renishaw plc, United Kingdom

[21] Appl. No.: 577,737

[22] Filed: Sep. 5, 1990

[30] Foreign Application Priority Data

Sep. 9, 1989 [GB] United Kingdom ............... 8920448

[51] Int. Cl.⁵ .................................................. G01B 9/02
[52] U.S. Cl. ................................................. 356/358
[58] Field of Search ............... 356/357, 358; 340/686, 340/825.35; 364/474.11

[56] References Cited

U.S. PATENT DOCUMENTS 4,643,577 2/1987 Roth et al. .......................... 356/358
4,973,952 11/1990 Malec et al. .................... 340/825.35

FOREIGN PATENT DOCUMENTS 0319582 6/1989 European Pat. Off. .
3706610 9/1988 Fed. Rep. of Germany .
2141365 12/1984 United Kingdom .
2162942 2/1986 United Kingdom .

*Primary Examiner*—Samuel A. Turner
*Attorney, Agent, or Firm*—Oliff & Berridge

[57] ABSTRACT

A measuring system for measuring the position of an object comprises a laser (10), a laser interferometer (16), and a detector (24). A series of sensors for sensing environmental conditions are provided; the sensors may be attached to the object. The sensors transmit information back to a central control (46) via LED transmitter (54). The transmitter (54) is powered from a battery (56) which is in turn charged by transducing (with a solar cell) part of the power of the light beam (12) generated by the laser (10). The sensors may be temperature sensors, pressure sensors, humidity sensors, refractive index sensors, vibration sensors, or beam alignment sensors.

18 Claims, 3 Drawing Sheets

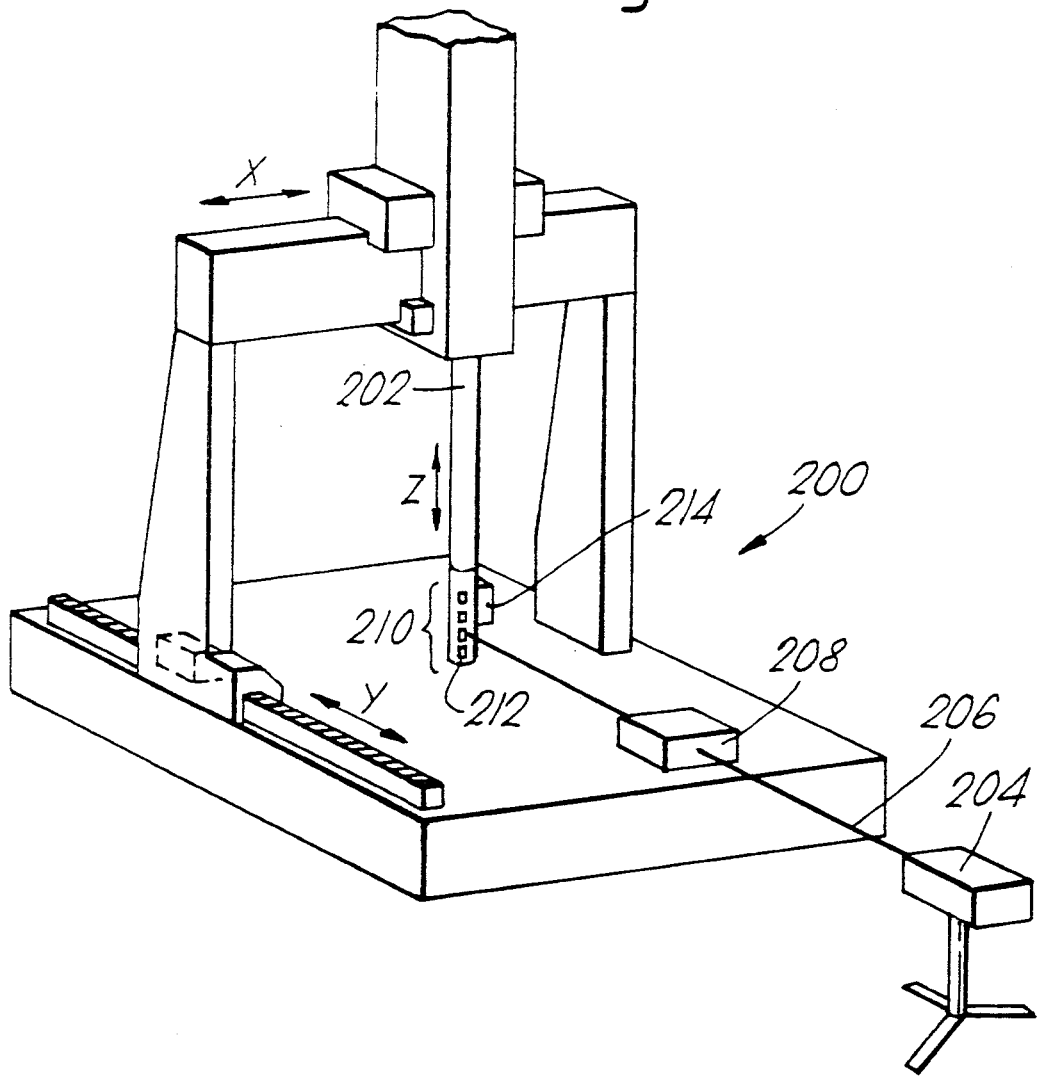

SYSTEM FOR MEASURING THE POSITION IN SPACE OF AN OBJECT USING A LIGHT BEAM

BACKGROUND OF THE INVENTION

1. Field of the Invention

The invention relates to a measuring system, which uses a light beam generated by a light source for measuring the position in space of an object, which may for example be the arm of a robot, a vehicle moveable along a track, or a head of a coordinate positioning machine.

An example of such a system is a laser interferometer, used to measure the position of a head of a coordinate positioning machine (eg: a coordinate measuring machine or machine tool). Typically the interferometer measures the head position to an accuracy of the order of a micron. Thus, phenomena such as for example temperature variation, small misalignments in the beam angle, small vocal variations in the refractive index of air, or vibration of the head can greatly affect the accuracy of any measurement made with the interferometer.

2. Description of the Art

It is known to provide a weather station in the vicinity of an optical measuring system, in order to monitor the ambient conditions; correction (if required) may thus be made to the measurement. Such weather stations however, only determine the value of the parameters affecting the ambient conditions in their immediate vicinity It may be necessary in order to achieve a required degree of accuracy, and/or in the case where the position of the object is to be measured in several different positions, to monitor such parameters, (and also one or more additional parameters discussed above) in several places.

SUMMARY OF THE INVENTION

Accordingly, the present invention provides a measuring system for measureing the position of an object attached to a machine for positioning the said object, comprising:

a light source for generating a light beam, the light from the light beam being incident upon the object, the object thereby interacting with the beam;

a detector for detecting a result of the said interaction, and generating detection signals accordingly;

a central control for receiving said detection signals and determining from the detection signals, the position of the object; and a sensing module, actuable by the light beam, comprising at least one sensor for sensing a physical parameter affecting the measurement of the position of the object, and means for transmitting a wireless signal indicating a value of said parameter, to the central control.

Thus, for example in the case where the object is a head of a coordinate positioning machine, and the position of the head is to be measured along a path, an array of sensors may be provided upon the head, and various parameters measured along the path; wireless signals from the transmitting means obviate the need for trailing cables from the head which may affect the measurement and/or prevent totally free movement of the head.

BRIEF DESCRIPTION OF THE DRAWINGS

Embodiments of the invention will now be described, by way of example, and with reference to the accompanying drawings in which:

FIG. 5 shows a coordinate positioning machine in combination with an embodiment of the present invention.

DESCRIPTION OF PREFERRED EMBODIMENTS

Figure 1:
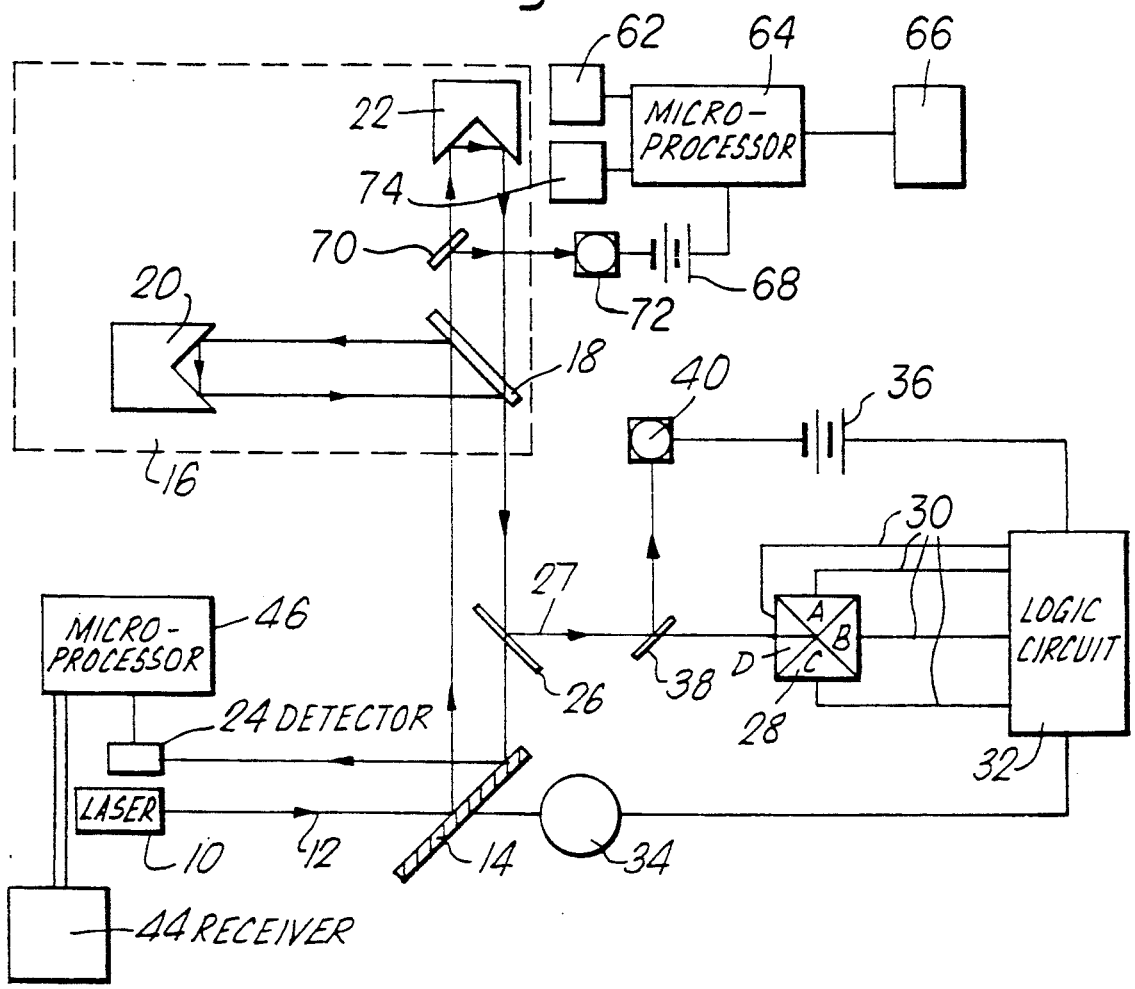
FIG. 1 shows a first embodiment of the present invention.

Referring now to FIG. 1, a laser 10 emits a substantially parallel beam of light 12. The beam 12 is utilized in an interferometer system 16 comprised of a plurality of optical elements. Specifically the interferometer system 16 comprises a beam splitter mirror 18 which directs part of the beam 12 onto a stationary retro-reflector 20, to form the reference arm of the interferometer system 16. The remaining part of the beam travels straight through beamsplitter mirror 18 without deviation, is incident upon a retro-reflector 22 (which is connected to an object whose position is to be measured), and thus forms the sensing arm of interferometer system 16. The return beams from retro-reflectors 20 and 22 are re-combined at beam splitter mirror 18 and the resultant interference fringes are detected at a detector 24. The detector 24 transmits detection signals to microprocessor 46 which determines from the detection signals the position of the retroreflector 22.

One of the parameters which determines the accuracy of the measurement is the alignment of the light beam 12 relative to the components of the interferometer system 16. In order to measure. and if required compensate for any misalignment which may occur,(due for example, to movement of interferometer relative to the laser), an apparatus for sensing and adjusting the alignment of the beam relative to the interferometer 16 is provided. The adjustment apparatus comprises a plane mirror 14, for directing the beam 12 into the interferometer system 16, and a beam splitter mirror 26 placed in the path of beam 12, downbeam of the interferometer. The beam splitter mirror 26 directs a component 27 of the beam 12 onto an electronic target for detecting the direction of propogation of the beam 12, which is in this case a quad cell 28 (NB. a charge coupled detector array or position sensitive detector may also be used). The four outputs (A,B,C,D) of quad cell 28 provide inputs for logic circuitry 32 which, on the basis of the input signals A,B,C,D) drives a 2-axis motor arrangement 34 to re-adjust the alignment of plane mirror 14. Thus, if the beam 12 becomes misaligned, the ratio of the light intensity falling on each part of the quad cell 28 will change from a preset ratio level which corresponds to proper alignment of the beam. This causes the logic circuitry 32 to actuate motors 34 and adjust the alignment of plane mirror 14 until the signal ratio in the input signals 30 returns to the preset level. This operation will be described in more detail later. Additionally, logic circuitry 32 may be linked to an LED (not shown), and coded signals may be transmitted to microprocessor 46, via receiver 44, to enable such corrections as may be necessary to be made to the measurement. Thus misalignmnt information may also be used to obtain some information which may be used to perform straightness measurements.

Logic circuitry 32 and motors 34 are powered from a re-chargeable battery 36 which obviates the need to power logic circuitry from a source external to the alignment sensing and adjustment apparatus 13. A beam splitter mirror 38, placed in the path of the component beam 27 deflects part of the beam component 27 onto a photo-voltaic cell. In this example the cell is cadmium sulphide solar cell 40, which charges re-chargeable battery 36. It would of course be possible to charge the battery 36 directly from the electrical power transduced by quad cell 28, however the quad cell 28 is less efficient than solar cell 40 in this regard. Alternatively a battery having a lifetime comparable to the lifetime of the operation may be used to power the logic circuitry and motors 34, the logic circuitry being actuated by the incidence of the beam 27 upon quad cells 28.

Typically, the majority of the time no alignment adjustment will be required, and so even low levels of light incident upon solar cell 40 will be sufficient to charge the battery 36. The logic circuitry 32 is typically CMOS circuitry, and therefore requires very little power for its operation. In systems where there is a high level of ambient light (e.g. daylight), the solar cell 40 will also be able to charge the battery using this light. However, if it is found that the power available is insufficient, it is possible to provide a second light source for the sole purpose of powering solar cell 40. The second light source need not be coherent or frequency stabilised and therefore may be provided at a much cheaper cost than laser 10.

Figure 2:
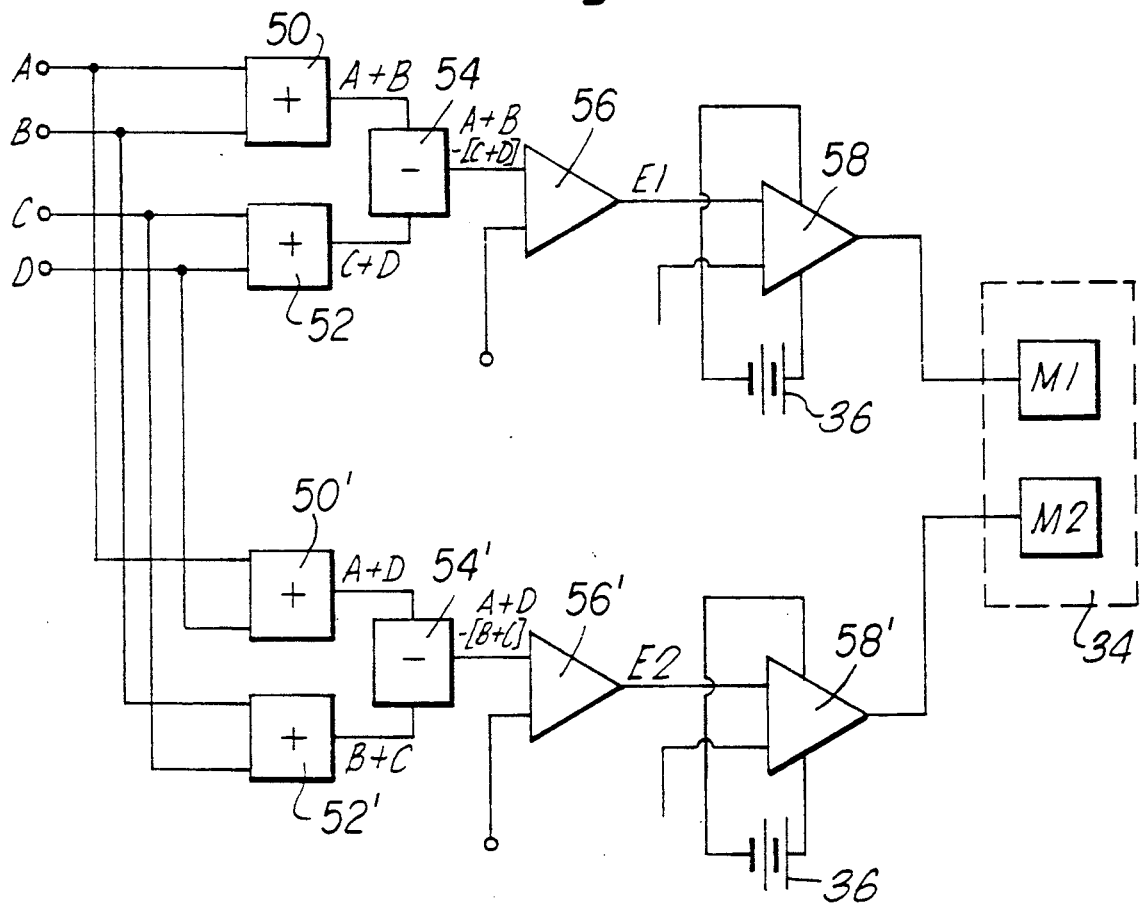
FIGS. 2 and 3 show components of the first embodiment in more detail.
Figure 3:
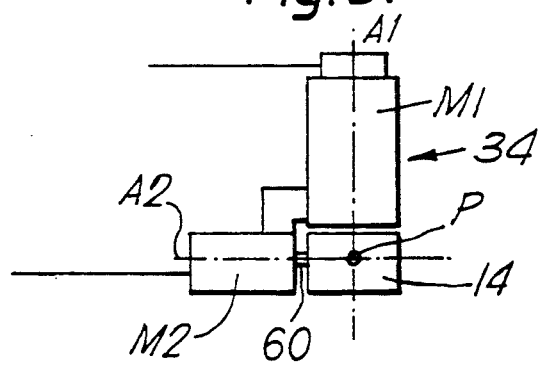

The operation of the logic circuitry and the 2-axis motor 34 will now be described in more detail with reference to FIGS. 2 and 3. Quad cell 28 comprises four sensitive regions A,B,C and D, each adapted to produce an electrical signal proportional to the intensity of incident light. Outputs A and B, and outputs C and D are fed to adding circuits 50 and 52 which output signals corresponding to the values A+B and C+D respectively. Each of these outputs is then fed into a subtraction circuit 54 which produces an output corresponding to the difference between the values of A+B and C+D, known as the difference output. The difference output represents the difference in intensity of light incident upon the half of the quad cell defined by areas A+B and the half defined by C+D. The difference output is fed into a comparator 56 which compares the value of the difference in output with a pre-set value X. The value of X is the value of the difference output when the beam is perfectly aligned. (NB. If when the beam is perfectly aligned equal levels of intensity are incident upon each of the four regions of the quad cell, the comparator 56 may be omitted altogether; however the use of a comparator is preferred since it enables greater flexibility when setting up the apparatus). The comparator output signal E1 is fed into an amplifier 58 (powered, as with all the other logic circuitry, by rechargeable battery 36), and the output of amplifier 58 is used to drive motor M1 of the motor arrangement 34 to realign the mirror in the appropriate direction. A similar operation is performed in respect of the beam alignment and the halves A,D and B,C of quad cell 28, using adding circuits 50' and 52', subtraction circuit 54' and a comparator 56' which provides an error signal E2 by comparison with pre-set value Y to drive motor M2.

The motors M1 and M2, and their relationship with deflecting mirror 14 will now be described with reference to FIG. 3. The motor arrangement 34 consists of a first motor M1, fixedly mounted on the apparatus support, and which rotates about an axis A1. A second motor M2, mounted for rotation with motor M1, rotates about an axis A2 which is perpendicular to axis A1. The mirror 14 is connected to motor M2 by a shaft 60 so that the motor M2 can rotate mirror 14 about axis A2, and rotation of motor M1 causes rotation of the mirror 14 about axis A1. Thus, the mirror is supported by the rotors for rotation about both axes A1 and A2 and also their point of intersection (shown in FIG. 3 as P). When the apparatus is set up, it is desirable that beam 12 is incident upon mirror 14 at point P. The attitude of motors 34 should be adjusted so that rotation of the mirror 14 about axes A1 and A2 causes the beam to move across the surface of quad cell 28 in directions parallel to the lines joining regions A,D and B,C, and A,B and C,D respectively.

As a substitute for the two axis motor arrangement 34, a series of piezo electric elements driven by an array of capacitors may be provided to adjust the attitude of plane mirror 14. With this arrangement, the mirror 14 will be mounted on a 2-axis spring-loaded ratchet arrangement which enables the piezo electric elements to "nudge" the mirror through a series of discrete attitudes.

As mentioned above, a laser used in interferometry requires stabilization of its frequency in accordance with ambient environmental variations and thus it is desirable to monitor such variations. Referring again to FIG. 1, the head of the machine (not shown) carries a temperature sensor (e.g. Pt resistance thermometer) 62. The output of the thermometer is sent to micro-processor 64 which sends coded signals to central microprocessor 46 via LED transmitter/receivers 66 and 44. The micro-processor 64 and LED transmitter/receiver 66 are powered from a rechargeable battery 68. A beam splitter mirror 70, situated in the path of beam 12 downbeam of beam splitter mirror 18 deflects part of the beam 12 onto a solar cell 72, which then charges the rechargeable battery 68. This can also apply for remote pressure relative humidity gas and refractive index sensors, all of which provide important correction factors in interferometric measurement.

It is also useful to determine the presence of vibration and/or flexing of the object whose position is being measured, and to this end an accelerometer 74 is also situated on the object. The accelerometer (which may for example, be a piezo electric element) outputs a signal representative of the degree of flexing and/or vibration experienced by retro-reflector 22. This information may be taken into account subsequently when measurement calculations are made to correct for any errors introduced by the vibration. The information is sent to micro-processor 46 in the same manner as the information on temperature derived by thermometers 62. The remote accelerometer may also be used for comparison with data taken using the interferometer itself as a vibrometer.

Figure 4:
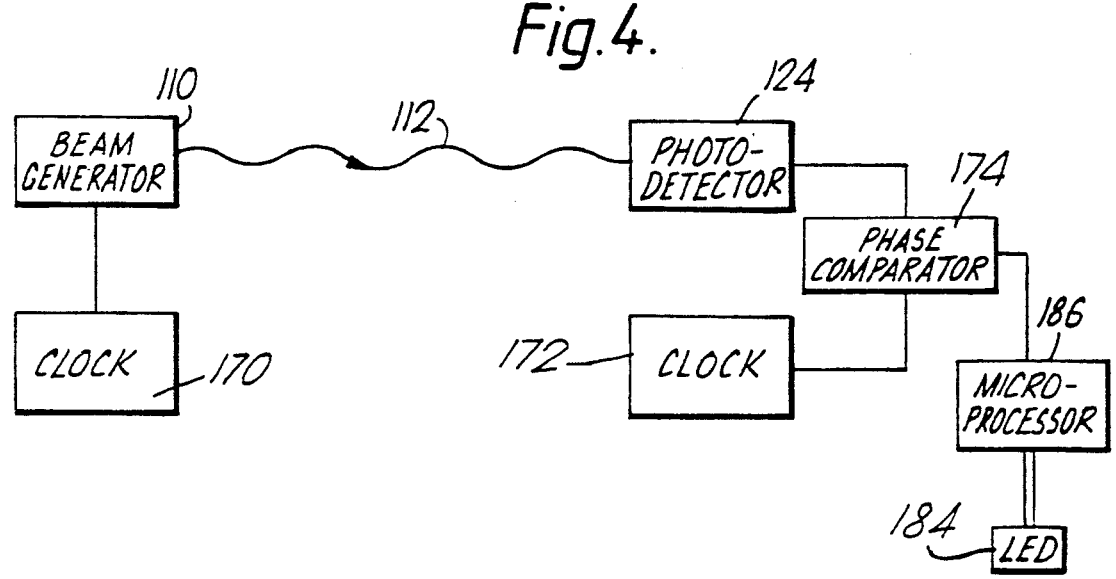
FIG. 4 shows a second embodiment of the present invention.

Distance measurement may also be made by amplitude modulation of a light beam. Referring to FIG. 4, a beam generator 110 emits a light beam 112, whose amplitude is modulated in by a clock 170. A sensing module is provided upon the object whose position is to be measured and comprises a photodetector 124 which detects the intensity of the beam 112 and transmits a detection signal to a phase comparator 174. The comparator 174 compares the detection signal with the output of clock 172, (which has the same frequency as, and a known phase relationship relative to, clock 170) and emits a phase output signal. Accordingly this phase output signal is transmitted to microprocessor 186 which actuates LED 184 to emit coded signals corresponding to the phase output signal. The coded signals are received by a receiver (not shown) and transmitted to a central microprocessor (also not shown) which determines from the phase output signal the distance between the beam generator 110 and photodetector 124 (and thus the object) as in earlier embodiments. The photodetector 124, clock 172, phase comparator 174, and microprocessor 184 may all be powered by a solar cell or by battery (whose power is only drawn when beam 112 is incident upon photodetector 124).

It is also possible to invert the arrangements described above to an extent, and provide a modulated light beam on the object whose position is to be measured. A beam generator provided on the object is locally powered as in previous embodiments and actuated by the incidence of a beam from a central control onto a photodetector provided on the object. This arrangement enables amongst other things, two measurements to be made of the position of the object using light beams travelling in different directions.

One of the most important parameters to take into account when measuring with a laser interferometer is the temperature gradient perpendicular to the beam. Referring to FIG. 5, a coordinate measuring machine 200 has a head 202 moveable in x,y, and z directions. The position of the head 202 in the illustrated example is to be measured in the y direction, and to this end a laser 204 emits a beam 206 which is incident via an interferometer 208 (providing a reference arm) upon a retroreflector (not shown) provided on the head 202. An array 210 of temperature sensors 212 is provided on the head 202 to determine the temperature gradient in the z direction. As with previous embodiments the data from the sensors is transmitted to a central control (not shown) by a module 214 comprising a microprocessor and transmitter, both locally powered.

Where detector, information acquisition systems, and transmitters are to be situated at various points about a given optical system, it is a useful embodiment of the present invention to provide the detector (or detector array) and logic circuitry (or micro-processor) on a single printed circuit board, together with suitable external focussing and alignment optics in one miniature package.

The techniques of the present invention may also be applied, if desired, to directly adjust the attitude of the laser (which may for example be mounted on a 3-axis stage). Alternatively, the light beam may be adjusted close to the point of its emission from the laser by adjusting the attitude of a pair of prismatic wedges. Where light from the laser discharges from the end of an optical fibre, it is also possible to adjust the alignment by adjusting the attitude of the optical fibre.

The optical alignment technique can also be used to align and operate a remote refractometer, as well as discrete sensors remotely placed.

I claim:

1. A measuring system for measuring the position of an object attached to a machine for positioning the object, comprising:
    a light source for generating a light beam, the light for the light beam following a beam path and being incident upon the object, the object thereby interacting with the beam;
    a detector for detecting a result of said interaction, and generating detection signals accordingly;
    a central control for receiving said detection signal and determining from the detection signals, the position of the object; and
    a sensing module provided on the object, and actuable by the light beam, comprising at least one sensor for sensing a physical parameter affecting the measurement of the position of the object, and means for transmitting at least one wireless signal indicating a value of said parameter, to the central control;
    wherein the object is a head of a coordinate positioning machine.

2. A system according to claim 1 wherein the, sensor in the sensing module is said detector, and the transmitting means transmits said detection signals.

3. A system according to claim 1 wherein each sensor in the sensing module is chosen from the group consisting of: a temperature sensor, a pressure sensor, a humidity sensor, a refractive index sensor, a beam alignment sensor, a vibration sensor.

4. A system according to claim 1 wherein the sensing module is powered by a battery.

5. A system according to claim 4 wherin the battery is charged from a photo-voltaic cell powered by a light beam.

6. A system according to claim 5 further comprising an auxiliary light beam for powering the photo-voltaic cell.

7. A system according to claim 1 further comprising an array of temperature sensors provided on the head, and spaced in a direction transverse to the beam, thereby to determine a temperature gradient across the beam.

8. A system according to claim 1, further comprising,
    a beam sensor for sensing the alignment of the light beam relative to the object; and
    deflecting means provided in the beam path for deflecting the beam through an angle dependent upon the relative orientation of the deflecting means and beam, and a motor for orienting the deflecting means.

9. A system according to claim 8, wherein said motor is powered by a battery.

10. A system according to claim 9 wherein said battery is charged by a photo-voltaic cell powered by a light beam.

11. A system according to claim 10 further comprising an auxiliary light beam for powering the photo voltaic cell.

12. A system according to claim 1 comprising a further light source provided on said object, for generating a further light beam, and a further detector provided on the central control for detecting the further light beam.

13. A measuring system for measuring the position of an object attached to a machine for positioning said object comprising:
    a light source for generating a light beam, the light for the light beam being incident upon the object, the object thereby intereacting with the beam;
    a detector for detecting a result of said interaction, and generating detection signals accordingly;
    a central control for receiving said detection signals and determining for the detection signals, the position of the object;
    a sensing module, actuable by the light beam, comprising at least one beam alignment sensor for sensing the alignment of the light beam relative to the object and generating at least one signal accordingly;

adjustable deflecting means provided in the incident beam path, for deflecting the beam through an angle dependent upon the relative orientation of the deflecting means and beam; and a remotely powered motor for orienting the deflecting means in dependence upon said at least one signal.

14. A system according to claim 13, wherein said motor is powered by a battery.

15. A system according to claim 14, wherein said battery is powered by a photo-voltaic cell.

16. A system according to claim 15 further comprising an ancillary beam for powering the photo-voltaic cell.

17. A system according to claim 13, wherein said motor is provided by a series of piezoelectric elements.

18. A system according to claim 13, wherein the sensing module further comprises means for transmitting wireless signals corresponding to said at least one signal to the central control, thereby to enable the central control to perform corrections to the determination of the position of the object.

* * * * *